Patented June 3, 1947

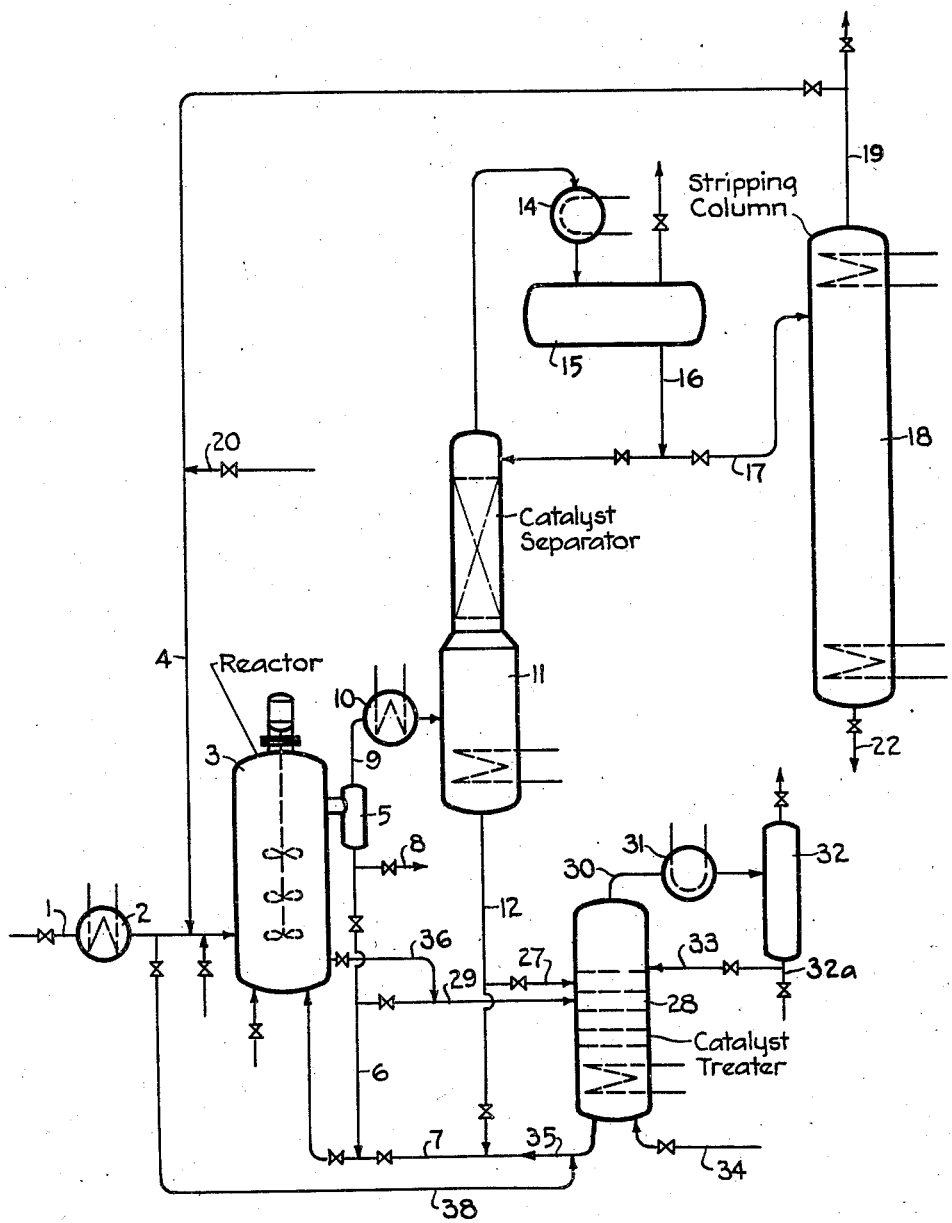

2,421,524

UNITED STATES PATENT OFFICE 2,421,524

PURIFICATION OF METAL HALIDE CATALYST IN CATALYTIC HYDROCARBON CONVERSIONS

William E. Ross, Berkeley, and George J. Carlson, El Cerrito, Calif., assignors to Shell Development Company, San Francisco, Calif., a corporation of Delaware Application April 22, 1944, Serial No. 532,348

6 Claims. (Cl. 260—683.5)

This invention relates to the treatment of hydrocarbons with the aid of catalysts comprising a metal halide of the Friedel-Crafts type and relates more particularly to improvements in the execution of catalytic hydrocarbon conversions with the aid of fluid catalysts comprising a halide of aluminum.

Catalysts comprising metal halides of the Friedel-Crafts type are utilized in the execution of many catalytic hydrocarbon conversions. They are employed, for example, in catalytic processes involving such hydrocarbon reactions as isomerization, alkylation, condensation, polymerization, etc. Of the metal halides of the Friedel-Crafts type, the halides of aluminum, particularly aluminum chloride and/or aluminum bromide are generally preferred. Advantageous catalysts of this type comprise those which are fluid under conditions of execution of the process. Such fluid type catalysts comprise those containing the metal halides of the Friedel-Crafts type, for example, an aluminum halide, as a suspension or solution in a suitable liquid vehicle. The liquid vehicle may comprise any suitable liquid which is inert, or has no disadvantageous effect upon catalyst and reactants under conditions of execution of the process. Suitable carrying liquids comprise, for example, hydrogen halides such as hydrogen chloride, alkyl halides, etc. Other fluid Friedel-Crafts type catalysts comprise the aluminum halide as a solution or suspension in a suitable molten salt or mixture of molten salts. The molten salts may simply function as the carrying medium, or they may act as catalyst modifiers or even as separate catalyst components to form a true multi-component catalyst. Particularly suitable molten salt type aluminum halide-containing catalysts of the fluid type comprise: molten mixtures of aluminum halides and halides of antimony, for example, a melt comprising aluminum chloride dissolved in antimony trichloride; a molten mixture comprising a halide of aluminum and at least one halide salt of an alkali or alkaline earth metal, etc. Still another type of fluid aluminum halide containing catalyst comprises fluid organo-aluminum halide complexes obtained by mixing aluminum halide with an organic compound with or without the addition of an anhydrous hydrogen halide under conditions resulting in the inter-action of the aluminum halide with the organic compound and/or decomposition products thereof. It is to be understood that the invention is in no wise limited to the use of a particular type of fluid catalyst comprising a metal halide of the Friedel-Crafts type, nor by the method by which the catalyst is prepared.

A difficulty inherent in the use of these catalysts resides in the adverse effect upon them of certain impurities often inherent in many of the available hydrocarbon feeds treated therewith. Of these impurities, the aromatic hydrocarbons such as benzene, alkyl derivatives thereof, etc., have a decidedly detrimental effect upon the efficiency with which these catalysts can be employed. The presence in any substantial amount of this impurity generally results in a marked decline in the rate of conversion to the desired product as well as a decrease in the active life of the catalyst. Small amounts of the aromatic hydrocarbons, it has been found, possess the desired attribute of suppressing hydrocarbon decomposition reactions at the low or moderately elevated temperatures generally employed in the execution of isomerization, alkylation, and polymerization reactions with the aid of these catalysts. The presence of only a well defined, small amount of such aromatic hydrocarbons in the feed would, therefore, be expected under certain conditions to be advantageous since any moderate decline in conversion rates or catalyst life would be compensated for to some degree by suppression of undesired hydrocarbon decomposition reactions. Tolerance of small amounts of aromatics in the hydrocarbon feed would, furthermore, be desirable since removal of the last traces of this impurity from the charge is often difficult and generally economically undesirable. It has been found, however, that in relatively large scale operations, the maintenance of the aromatic content of the charge to only a small amount, for example, a fraction of a per cent, results in a decrease in conversion rates and catalyst life which become progressively more pronounced as the operation proceeds. Such effect upon catalyst life and conversions obtained in the isomerization of saturated hydrocarbons with the aid of a fluid catalyst comprising a metal halide of the Friedel-Crafts type is illustrated by the following example:

EXAMPLE I

A methylpentane fraction was isomerized by contact with a fluid catalyst comprising aluminum chloride dissolved in molten antimony trichloride at a temperature of 80° C., and a contact time of 4.8 to 5.5 minutes. Hydrogen chloride, in an amount equal to an amount of about 9% by weight of the charge, was added to the system. The operation was repeated in two parallel operations with separate portions of the same feed and at substantially identical operating conditions with the exception that benzene, in the amounts indicated in the table below, was added to the charge. Average conversion of methylpentane to neohexane, as well as catalyst life in terms of pounds of neohexane produced per pound of aluminum chloride in the catalyst, are indicated in the following table for each of the operations.

Table A

| Per cent by weight of benzene in hydrocarbon charge | Average conversion to neohexane | Pounds neohexane produced per pound of aluminum chloride in the catalyst |
|---|---|---|
| 0.0 | 23.5 | 51 |
| 0.6 | 20 | 39 |
| 1.2 | 12.5 | 20 |

It is seen from the above example that the presence of the aromatic hydrocarbon in the feed in even such small amounts as 0.6% results in a serious decline in the conversion rate and life of the catalyst. The adverse effect exerted by this impurity presents a serious problem in the treatment of hydrocarbons or hydrocarbon mixtures comprising hydrocarbons having at least six carbon atoms to the molecule, such as normal hexane, methylpentanes, normal heptane, branched heptanes, octanes, methylcyclopentane, cyclohexane, dimethylcyclopentane, methylcyclohexane, etc., or hydrocarbon fractions comprising them, from which aromatics of corresponding boiling range cannot be economically separated on a practical scale by such methods as fractionation.

It has now been found that the aromatic hydrocarbons which are present in a mixture comprising paraffins and/or naphthenic hydrocarbons are selectivley removed by the fluid type catalysts comprising a metal halide of the Friedel-Crafts type and are retained in the catalyst mass. Such selective absorption and/or solution of the impurity in the catalyst results in an accumulation of the aromatic hydrocarbon, rendering ineffective any attempt to maintain a small but critical amount of aromatics in the system by mere control of the aromatic content of the feed to the process. In order to avoid the serious difficulties inherent in such accumulation of the aromatics within the system of processes available heretofore, complete removal of all traces of aromatics from the charge had to be resorted to. It has now been found that the adverse effect of the presence of aromatics in the feed is obviated to at least a substantial degree by continuously subjecting at least a part of the catalyst to a treatment within the system of the process to continuously remove aromatic hydrocarbons therefrom.

In accordance with the process of the invention, the hydrocarbon or hydrocarbon mixture to be converted containing aromatic hydrocarbons is contacted with the fluid catalyst comprising a metal halide of the Friedel-Crafts type, under conditions resulting in the conversion to the desired products in a conventional type of reactor. Effluence from the reactor is generally passed through suitable entrained-catalyst separating zones to a product separating zone. A portion of catalyst is continuously taken from the catalyst separating zone and/or reaction zone and subjected to a treatment resulting in the removal therefrom of aromatic hydrocarbons. The resulting treated portion of catalyst, now free of any substantial amount of aromatic hydrocarbons, is returned to the reaction zone.

The process of the invention thus enables the treatment of hydrocarbons or hydrocarbon mixtures initially containing aromatic hydrocarbons with substantially increased catalyst life and conversion rates, without the heretofore necessary, highly uneconomical complete removal of the impurity from the feed. It, furthermore, enables control of the quantity of aromatic hydrocarbon within the system, thereby enabling the efficient utilization of the inhibiting effect exerted by small amounts of aromatic hydrocarbons, initially present or willfully added, upon the hydrocarbon decomposition reaction in those particular operations wheren such inhibition is expedient.

In order to set forth more clearly the nature of the invention, it will be described in detail herein in its application to the isomerization of hydrocarbons initially containing aromatic hydrocarbons as an impurity, with reference to the attached drawing wherein the single figure represents more or less diagrammatically one form of apparatus suitable for carrying out the process of the invention.

A hydrocarbon mixture for example, a hexane fraction, comprising isomerizable saturated hydrocarbons including normal hexane, methylcyclopentane, and an aromatic hydrocarbon impurity, for example, benzene, is passed from an outside source through valved line 1 and heating means 2 into reactor 3. Within reactor 3 the hydrocarbon stream is contacted with a fluid isomerization catalyst comprising a metal halide of the Friedel-Crafts type, for example, a catalyst melt comprising aluminum chloride dissolved in molten antimony trichloride. Although a catalyst of the molten salt type is chosen in the present illustrative description of the invention, other fluid type catalysts comprising a metal halide of the Friedel-Crafts type may be employed. A suitable isomerization temperature in the range of, for example, from room temperature to about 250° C. and preferably from about 50° C. to about 150° C. is maintained within reactor 3. A hydrogen halide promoter, for example, hydrogen chloride is introduced into the reactor through lines 4 and 1. Under these conditions the hexane fraction will be converted within reactor 3 to a hydrocarbon mixture comprising branched hexanes and cyclohexane.

Reactor effluence comprising hydrocarbon reactants, hydrogen chloride, and catalyst is passed from reactor 3 into separator 5 wherein a lower layer consisting essentially of catalyst is separated by stratification from an upper hydrocarbon layer. A portion of the catalyst phase is recycled from separator 5 through valved lines 6 and 7 into reactor 3. A valved line 8 is provided for removal of catalyst from the system.

Though substantial separation of catalyst is effected by stratification in catalyst separator 5, a certain amount of catalyst will, nevertheless, still remain in the hydrocarbon phase. The antimony trichloride, possessing appreciable solubility in the paraffinic hydrocarbon, will comprise the predominant part of the catalyst remaining in the hydrocarbon phase. The hydrocarbon phase is passed from separator 5 through line 9 and heat interchanger 10 into a final catalyst separator 11. Within separator 11 a liquid fraction consisting predominantly of antimony trichloride and a smaller proportion of aluminum chloride is separated from a vapor fraction comprising hydrocarbons and hydrogen chloride promoter. A portion of the liquid catalyst fraction is passed from separator 11 through valved lines 12 and 7 to reactor 3. Vapor overhead is passed from column 11 through condenser 14 into an accumulator 15. From accumulator 15, products comprising hydrocarbons and hydrogen chloride are passed through lines 16 and 17 into stripping column 18. Within stripping column 18 a normally gaseous fraction comprising hydrogen chloride is removed overhead and recycled through lines 19, 4 and 1 to reactor 3. Make up hydrogen chloride is introduced into the system through valved line 20. A liquid hydrocarbon fraction comprising branched hexanes and cyclohexane is taken from stripper 18 through valved line 22. The hydrocarbon fraction thus produced may be passed to further conventional product separating means from which unconverted hydrocarbons may be recycled to reactor 3.

Under such conditions of operation an accumulation of the benzene impurity in the catalyst mass within the system, with a corresponding decrease in conversion rate and catalyst life, will be encountered. The degree to which the aromatic hydrocarbons are selectively absorbed by the catalyst is exemplified by the following example:

EXAMPLE II

A hydrocarbon fraction having the following composition:

| | Per cent by weight |
|---|---|
| Normal hexane | 39.5 |
| Methylcyclopentane | 50.5 |
| Benzene | 9.7 |
| Undetermined | 0.3 | was isomerized by contact with a fluid catalyst consisting of AlCl$_3$ dissolved in molten SbCl$_3$ at a temperature of 100° C. Stratification of mixed reactants and catalyst resulted in an upper hydrocarbon layer and a lower catalyst layer. Upon separation by distillation, the hydrocarbon layer was found to consist of:

| | Per cent by weight |
|---|---|
| Catalyst | 25 |
| Naphthenes and paraffins | 71.3 |
| Benzene | 3.7 |

The catalyst layer upon distillation was found to consist of:

| | Per cent by weight |
|---|---|
| Catalyst | 95 |
| Naphthenes and paraffins | 3.2 |
| Benzene | 1.8 |

It is seen that whereas the concentration of benzene in the hydrocarbon feed was only 9.7%, that of the hydrocarbons absorbed by the catalyst amounted to 36%.

An inordinately high proportion of benzene will be found not only in the catalyst in reactor 3 and separator 5, but in the liquid catalyst fraction eliminated as bottoms in separator 11. Conditions conducive to efficient separation of desired hydrocarbon products from the liquid catalyst fraction in separator 11 will generally not effect the removal to any substantial degree of aromatics from the catalyst fraction thus separated. Attempts to utilize more drastic conditions to strip at least a substantial portion of the aromatic content from the catalyst fraction separated in column 11 will generally result in hydrocarbon cracking and other undesirable side reactions occasioning not only a loss of desirable products, but also the loss of catalyst due to interaction of catalyst and products of the side reactions. Such conditions would furthermore result in a fouling and clogging of apparatus to a degree impeding practical operation of the process.

The liquid fraction comprising antimony trichloride and aluminum chloride separated in column 11 is therefore passed at least in part, and preferably in its entirety, through valved line 27 into a catalyst treating zone. At least a part of the catalyst passed from separator 5 through line 6 is also diverted through line 29 into the catalyst treating zone. Within the catalyst treating zone the catalyst is subjected to suitable treatment capable of removing aromatic hydrocarbons therefrom. Such treatment may comprise any of several steps comprising, for example, distillation, scrubbing, etc. The catalyst treating zone may comprise a suitable column or still 28. Within column 28 the catalyst is subjected to sufficiently drastic distillation conditions of temperature, and optionally of reduced pressure, to effect the removal of aromatic hydrocarbons therefrom. Resulting hydrocarbon vapors comprising the benzene impurity are eliminated from column 28 through line 30 and passed through condenser 31 into accumulator 32. Since antimony trichloride possesses appreciable volatility, a portion of the condensate is returned from accumulator 32, through valved lines 32a and 33, as reflux to the upper part of column 28. Maximum temperature conditions to be maintained in the lower part of column 28 will vary with pressure maintained in the column and with the nature of the particular catalyst used in the process. Thus, at atmospheric and relatively low superatmospheric pressures up to, for example, about 50 pounds, temperatures in the range of, for example, from about 80° C. to about 200° C. and preferably from about 90° C. to about 120° C. are suitable. Higher temperatures are resorted to at higher pressures. Thus, at a pressure of about 100 pounds, temperatures in the range of from about 160° C. to 300° C. are employed. At times it may be desirable to introduce a gaseous stream from an outside source through valved line 34 into the lower part of column 28 to aid in stripping the aromatic hydrocarbon from the catalyst. Such gaseous stream may comprise an inert gas such as, for example, hydrogen, nitrogen, methane, ethane, gaseous mixtures comprising these gases, etc. The treated catalyst, now free of any substantial amount of aromatic hydrocarbons, is passed from column 28 through line 35 to the reactor 3. In order to facilitate the flow of catalyst from column 28 to reactor 3, a portion of the hydrocarbon charge may be diverted from line 1 through valved line 38 and introduced into line 35 at a point close to the outlet of column 28.

In general, in processes wherein catalyst is removed from the reactor and separated from reactants in a catalyst separating zone, the continuous passage of such separated catalyst from the separating zones to the catalyst treating zone will generally suffice to effect adequate removal of aromatic hydrocarbons from the catalyst mass within the system. At times it may be essential, however, to effect the continuous or intermittent withdrawal of a separate portion of catalyst from the reactor and pass it through valved lines 36 and 29 to column 28. Such additional catalyst removal is especially resorted to when only a relatively small amount of catalyst is passed to the catalyst separators such as is the case, for example, when operating with the hydrocarbon reactants in the vapor phase.

The rate at which catalyst is passed to the catalyst treating tower 28 may vary within the scope of the invention. Prolonged contact of the aromatic hydrocarbon with the catalyst during operating conditions will generally result in a de-activation of catalyst to a degree which cannot be rectified by subsequent treatment of the thus deactivated catalyst. The catalyst is therefore subjected to the de-aromatization treatment at a sufficiently rapid rate to prevent the accumulation of any substantial amount of aromatic hydrocarbon impurities in the catalyst mass. In general, it will be advantageous to maintain the aromatic content of the catalyst mass as low as possible within the realm of practicability, for example, below about 0.5% and preferably below about 0.3% by weight of the hydrocarbon reactants in the reaction zone. In certain cases, however, such as, for example, in the treatment of hydrocarbons which readily undergo decomposition in the presence of metal halide catalysts, it is at times desirable to control the aromatic removal within catalyst treater 28 in such a manner as to maintain an aromatic content within the reaction zone not exceeding about 1%, and preferably not exceeding about 0.5% by weight of the hydrocarbon reactants in the reaction zone.

Thus, although the invention has been described in detail in its application to the isomerization of a hexane fraction initially containing aromatic hydrocarbons, the invention is applicable to those processes treating hydrocarbons with the aid of Friedel-Crafts type catalysts wherein an aromatic hydrocarbon is added to the hydrocarbon feed for the purpose of suppressing hydrocarbon decomposition. In the isomerization of the readily degraded open chain paraffin hydrocarbons such as, pentanes, hexanes, heptanes, etc., initially free of aromatics, with the aid of an aluminum halide-containing catalyst, an aromatic hydrocarbon may be added to the feed to suppress hydrocarbon decompositions. The efficiency with which the added aromatic hydrocarbon suppresses the decomposition reaction is illustrated by the following example.

EXAMPLE III

Pentane was isomerized by contact with a catalyst comprising anhydrous aluminum chloride dissolved in antimony trichloride under the following conditions:

| | |
|---|---|
| Temperature °C | 90 |
| Phase ratio of catalyst to hydrocarbon | 1:1 |
| HCl added to feed, weight per cent of feed per cent | 4–5 |
| Contact time minutes | 9 |
| Pressure pounds | 260–280 |
| Feed rate kg. of hydrocarbon feed/hour | 2.04 to 2.21 |

The results obtained in a plurality of operations conducted under the above conditions differing from one another only in the amount of benzene added to the hydrocarbon feed are indicated in the following table:

Table B

| | | | | | | | |
|---|---|---|---|---|---|---|---|
| Benzene added per cent by weight of feed | 0.03 | 0.03 | 0.079 | 0.12 | 0.14 | 0.28 | 0.46 |
| Average conversion to isopentane | 30.2 | 22.3 | 50.5 | 41.0 | 50.6 | 45.8 | 37.1 |
| Catalyst life kg. of isopentane/kg. $AlCl_3$ | --- | --- | 296 | --- | 280 | 230 | 218 |
| Disproportionation to butane, weight per cent | 4.1 | 2.8 | 0.7 | 1.3 | 1.4 | 0.0 | 0.0 |

It is apparent from the foregoing example that the presence of benzene in an amount as low as 0.3 per cent by weight of the pentane feed completely suppresses decomposition of pentane. The advantages thereby obtained considerably offset the loss in catalyst life occasioned by the presence of the small amount of benzene. As the process proceeds, however, selective absorption of benzene by the catalyst renders difficult, if not impossible, control of the amount of aromatics in the system in the absence of the continuous or intermittent aromatic removal in accordance with the invention. Addition of the aromatic inhibitor until the definite proportion has been absorbed by the catalyst without further aromatic addition and without aromatic removal from the catalyst, however, does not achieve the desired result and soon produces a deactivation of the catalyst to a degree which cannot be rectified by subsequent resumption of catalyst treatment in accordance with the invention.

For the purpose of clarity all parts of the apparatus not essential to a complete description of the invention, comprising for example, pumps, condensers, accumulators and the like, have been omitted from the drawing. It is to be understood that the apparatus shown may be modified as apparent to one skilled in the art without departing from the scope of the invention. The invention is, for example, in no wise limited to the use of the particular mixer type of reactor shown in the drawing. The invention is applicable to processes utilizing any suitable type of reactor enabling efficient contact of catalyst and hydrocarbon reactants. Such reactors comprise, for example, those of the enlarged chamber type, optionally provided with suitable baffles, plates, solid packing material or the like, wherein the hydrocarbons are contacted countercurrently with a downward flow of fluid catalyst, and wherein catalyst is circulated from the lower part to the upper part of the reactor. When employing this type of reactor, the portion of catalyst passed in continuous or intermittent stream to the catalyst treating tower 28, wherein aromatics are removed therefrom, is preferably taken directly from the lower part of the reactor, or from any point in the line through which the catalyst is passed from the lower part to the upper part of the tower.

The invention is in no wise limited in its application to the treatment of a particular hydrocarbon fraction or single hydrocarbon, comprising aromatic hydrocarbon-containing impurities admixed therewith or containing aromatic hydrocarbons willfully added thereto. The invention may be applied broadly to the treatment of any saturated aliphatic hydrocarbon, or mixtures thereof, containing an aromatic hydrocarbon. By the term aliphatic hydrocarbon it is intended to include not only the open chain hydrocarbons such as, for example, the pentanes, hexanes, heptanes, octanes, hydrocarbon fractions comprising them, etc., but also the saturated alicyclic hydrocarbons such as, for example, methylcyclopentane, dimethylcyclopentane, cyclohexane, methylcyclohexane, mixtures thereof, hydrocarbon fractions comprising them, etc. The invention is furthermore applicable not only to the execution of isomerization reactions, but to other types of hydrocarbon conversion operations treating hydrocarbons comprising a saturated aliphatic hydrocarbon containing an aromatic hydrocarbon, wherein use is made of fluid catalysts, or contact material, comprising a metal halide of the Friedel-Crafts type. Such conversions comprise not only isomerization, but also polymerization, alkylation, desulfurization, reforming, etc., of saturated aliphatic hydrocarbons or saturated aliphatic hydrocarbon-containing materials.

We claim as our invention:

1. In a process for the execution of catalytic hydrocarbon conversions wherein hydrocarbons comprising a major portion of saturated aliphatic hydrocarbons in admixture with a minor portion of aromatic hydrocarbons are contacted at conversion conditions with a fluid catalyst comprising a metal halide of the Friedel-Crafts type in a conversion zone whereby aromatic hydrocarbons are selectively absorbed by said catalyst, the combination of steps which comprises passing effluent comprising converted hydrocarbons and a portion of said catalyst containing absorbed aromatic hydrocarbons from the reaction zone into a first distillation zone, separating a vapor fraction comprising aliphatic hydrocarbons from a liquid fraction comprising fluid catalyst containing absorbed aromatic hydrocarbons in said first distillation zone, passing said liquid fraction from said first distillation zone into a second distillation zone, continuously withdrawing a separate portion of catalyst containing absorbed aromatic hydrocarbons from said reaction zone before said catalyst has become spent, passing said separately withdrawn portion of catalyst into said second distillation zone, subjecting said catalyst in said second distillation zone to distillation condition effecting the substantially complete removal of absorbed aromatic hydrocarbons as a vapor fraction from said fluid catalyst in the absence of any substantial catalyst decomposition, passing fluid catalyst substantially free of aromatic hydrocarbons from said second distillation zone to said reaction zone, and effecting said separate withdrawal of catalyst from said reaction zone and removal of aromatic hydrocarbons therefrom at a rate sufficiently high to avoid the accumulation to any substantial degree of absorbed aromatic hydrocarbons in the catalyst in said reaction zone.

2. In a process for the execution of catalytic hydrocarbon conversions wherein hydrocarbons comprising a major portion of saturated aliphatic hydrocarbons in admixture with a minor portion of aromatic hydrocarbons are contacted at conversion conditions with a fluid catalyst comprising a halide of aluminum in a conversion zone whereby aromatic hydrocarbons are selectively absorbed by said catalyst, the combination of steps which comprises passing effluent comprising converted hydrocarbons and a portion of said catalyst containing absorbed aromatic hydrocarbons from the reaction zone into a first distillation zone, separating a vapor fraction comprising aliphatic hydrocarbons from a liquid fraction comprising fluid catalyst containing absorbed aromatic hydrocarbons in said first distillation zone, passing said liquid fraction from said first distillation zone into a second distillation zone, continuously withdrawing a separate portion of catalyst containing absorbed aromatic hydrocarbons from said reaction zone before said catalyst has become spent, passing said separately withdrawn portion of catalyst into said second distillation zone, subjecting said catalyst in said second distillation zone to distillation condition effecting the substantially complete removal of absorbed aromatic hydrocarbons as a vapor fraction from said fluid catalyst in the absence of any substantial catalyst decomposition, passing fluid catalyst substantially free of aromatic hydrocarbons from said second distillation zone to said reaction zone, and effecting said separate withdrawal of catalyst from said reaction zone and removal of aromatic hydrocarbons therefrom at a rate sufficiently high to maintain the concentration of absorbed aromatic hydrocarbons in the catalyst in said reaction zone below about one percent by weight of the hydrocarbon reactants in said reaction zone.

3. In a process for the execution of catalytic hydrocarbon conversions wherein hydrocarbons comprising a major portion of saturated aliphatic hydrocarbons in admixture with a minor portion of aromatic hydrocarbons are contacted at conversion conditions with a fluid catalyst comprising aluminum chloride in a conversion zone whereby aromatic hydrocarbons are selectively absorbed by said catalyst, the combination of steps which comprises passing effluent comprising converted hydrocarbons and a portion of said catalyst containing absorbed aromatic hydrocarbons from the reaction zone into a first distillation zone, separating a vapor fraction comprising aliphatic hydrocarbons from a liquid fraction comprising fluid catalyst containing absorbed aromatic hydrocarbons in said first distillation zone, passing said liquid fraction from said first distillation zone into a second distillation zone, continuously withdrawing a separate portion of catalyst containing absorbed aromatic hydrocarbons from said reaction zone before said catalyst has become spent, passing said separately withdrawn portion of catalyst into said second distillation zone, subjecting said catalyst in said second distillation zone to distillation condition effecting the substantially complete removal of absorbed aromatic hydrocarbons as a vapor fraction from said fluid catalyst in the absence of any substantial catalyst decomposition, passing fluid catalyst substantially free of aromatic hydrocarbons from said second distillation zone to said reaction zone, and effecting said separate withdrawal of catalyst from said reaction zone and removal of aromatic hydrocarbons therefrom at a rate sufficiently high to maintain the concentration of absorbed aromatic hydrocarbons in the catalyst in said reaction zone below about 0.5 percent by weight of the hydrocarbon reactants in said reaction zone.

4. In catalytic hydrocarbon isomerization process wherein hydrocarbons comprising an isomerizable saturated hydrocarbon containing an aromatic hydrocarbon are contacted at isomerizing conditions with a fluid isomerization catalyst comprising a halide of aluminum in a conversion zone whereby said aromatic hydrocarbon is selectively absorbed by said catalyst, the combination of steps which comprises passing effluent comprising isomerized hydrocarbons and a portion of said catalyst containing absorbed aromatic hydrocarbon from the reaction zone into a first distillation zone, separating a vapor fraction comprising isomerized aliphatic hydrocarbons from a liquid fraction comprising fluid catalyst containing absorbed aromatic hydrocarbon in said first distillation zone, passing said liquid fraction from said first distillation zone into a second distillation zone, continuously withdrawing a separate portion of catalyst containing absorbed aromatic hydrocarbon from said reaction zone before said catalyst has become spent, passing said separately withdrawn portion of catalyst into said second distillation zone, subjecting said catalyst in said second distillation zone to distillation condition effecting the substantially complete removal of absorbed aromatic hydrocarbon as a vapor fraction from said fluid catalyst in the absence of any substantial catalyst decomposition, passing fluid catalyst substantially free of aromatic hydrocarbon from said second distillation zone to said reaction zone, and effecting said separate withdrawal of catalyst from said reaction zone and removal of aromatic hydrocarbon therefrom at a rate sufficiently high to maintain the concentration of absorbed aromatic hydrocarbon in the catalyst in said reaction zone below about 0.5 per cent by weight of the hydrocarbon reactants in said reaction zone.

5. In a catalytic hydrocarbon isomerization process wherein hydrocarbons comprising an isomerizable saturated hydrocarbon and an aromatic hydrocarbon consisting essentially of benzene are contacted at isomerizing conditions with a fluid isomerization catalyst comprising aluminum chloride in a conversion zone whereby said aromatic hydrocarbon is selectively absorbed by said catalyst, the combination of steps which comprises passing effluent comprising isomerized hydrocarbons and a portion of said catalyst containing absorbed aromatic hydrocarbon from the reaction zone into a first distillation zone, separating a vapor fraction comprising isomerized aliphatic hydrocarbons from a liquid fraction comprising fluid catalyst containing absorbed aromatic hydrocarbon in said first distillation zone, passing said liquid fraction from said first distillation zone into a second distillation zone, continuously withdrawing a separate portion of catalyst containing absorbed aromatic hydrocarbon from said reaction zone before said catalyst has become spent, passing said separately withdrawn portion of catalyst into said second distillation zone, subjecting said catalyst in said second distillation zone to distillation condition effecting the substantially complete removal of absorbed aromatic hydrocarbon as a vapor fraction from said fluid catalyst in the absence of any substantial catalyst decomposition, passing fluid catalyst substantially free of aromatic hydrocarbon from said second distillation zone to said reaction zone, and effecting said separate withdrawal of catalyst from said reaction zone and removal of aromatic hydrocarbons therefrom at a rate sufficiently high to avoid the accumulation to any substantial degree of absorbed aromatic hydrocarbon in the catalyst in said reaction zone.

6. In a process for the execution of catalytic hydrocarbon conversions wherein hydrocarbons comprising a major portion of saturated aliphatic hydrocarbons in admixture with a minor portion of aromatic hydrocarbons are contacted at conversion conditions with a fluid catalyst comprising a metal halide of the Friedel-Crafts type in a conversion zone whereby aromatic hydrocarbons are selectively absorbed by said catalyst, the combination of steps which comprises passing converted hydrocarbons and a portion of said catalyst containing absorbed aromatic hydrocarbons from the conversion zone into a first distillation zone, separating a vapor fraction comprising aliphatic hydrocarbons from a liquid fraction comprising fluid catalyst containing absorbed aromatic hydrocarbons in said first distillation zone, passing said liquid fraction from said first distillation zone into a second distillation zone, subjecting said catalyst in said second distillation zone to distillation conditions effecting the substantially complete removal of absorbed aromatic hydrocarbons as a vapor fraction from said fluid catalyst in the absence of any substantial catalyst decomposition, passing fluid catalyst substantially free of aromatic hydrocarbons from said second distillation zone to said conversion zone, and effecting said passage of catalyst from said conversion zone to said distillation zone at a rate sufficiently high to avoid the accumulation to any substantial degree of absorbed aromatic hydrocarbons in the catalyst in said conversion zone.

WILLIAM E. ROSS.
GEORGE J. CARLSON.

REFERENCES CITED

The following references are of record in the file of this patent:

UNITED STATES PATENTS

| Number | Name | Date |
|---|---|---|
| 2,293,891 | Evering et al. | Aug. 25, 1942 |
| 2,331,429 | Sensel et al. | Oct. 12, 1943 |
| 2,349,821 | Fragen | May 30, 1944 |
| 2,250,118 | Smithuysen | July 22, 1941 |
| 2,299,716 | van Peski | Oct. 20, 1942 |
| 2,220,092 | Evering | Nov. 5, 1940 |
| 2,250,410 | van Peski | July 22, 1941 |
| 2,260,279 | D'Ouville et al. | Oct. 21, 1941 |
| 2,394,412 | Veltman | Feb. 5, 1946 |

OTHER REFERENCES

Forziati et al., Article in proceedings of 24th Annual Meeting, A. P. I., vol. 24, (III) 1943; pages 34–48. (Copy in Div. 31–196–150.)